United States Patent
Ghosh et al.

(10) Patent No.: US 9,998,197 B2
(45) Date of Patent: Jun. 12, 2018

(54) SIGNALING TECHNIQUES TO SUPPORT DOWNLINK (DL) MULTI-USER MULTIPLE-INPUT MULTIPLE-OUTPUT (MU-MIMO) IN 60 GHZ WIRELESS NETWORKS

(71) Applicant: INTEL IP CORPORATION, Santa Clara, CA (US)

(72) Inventors: Chittabrata Ghosh, Fremont, CA (US); Carlos Cordeiro, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 145 days.

(21) Appl. No.: 14/672,120

(22) Filed: Mar. 28, 2015

(65) Prior Publication Data
US 2016/0204898 A1    Jul. 14, 2016

Related U.S. Application Data

(60) Provisional application No. 62/101,918, filed on Jan. 9, 2015.

(51) Int. Cl.
| | | |
|---|---|---|
| H04L 1/00 | (2006.01) |
| H04B 7/06 | (2006.01) |
| H04B 7/0413 | (2017.01) |
| H04W 74/00 | (2009.01) |
| H04W 72/00 | (2009.01) |
| H04W 72/04 | (2009.01) |
| H04W 8/18 | (2009.01) |
| H04W 4/08 | (2009.01) |
| H04W 52/02 | (2009.01) |
| H04W 4/06 | (2009.01) |

(52) U.S. Cl.
CPC ......... *H04B 7/0697* (2013.01); *H04B 7/0413* (2013.01); *H04W 4/06* (2013.01);
(Continued)

(58) Field of Classification Search
CPC .......... H04W 72/046; H04W 72/0406; H04W 72/042; H04W 84/12; H04W 72/048; H04W 52/0216; H04W 4/06; H04W 4/08; H04W 52/0206; H04W 8/186; H04W 74/006; H04W 72/005; H04B 7/0452; H04B 7/0413; H04B 7/0697
See application file for complete search history.

(56) References Cited

U.S. PATENT DOCUMENTS 8,599,804 B2 * 12/2013 Erceg ................... H04B 7/0452
370/338
8,891,666 B2 * 11/2014 Lee ...................... H04B 7/0452
375/295

(Continued)

OTHER PUBLICATIONS

Office Action received for U.S. Appl. No. 15/457,653, dated Oct. 5, 2017, 10 pages.

*Primary Examiner* — Brian O'Connor

(57) ABSTRACT

Signaling techniques to support DL MU-MIMO in 60 GHz wireless networks are described. According to various such techniques, a transmitting 60 GHz-capable device may be configured to include DL MU-MIMO control information in a PHY header of a PPDU that comprises respective data for multiple receiving devices. In some embodiments, the DL MU-MIMO control information may include information identifying each such receiving device. In various embodiments, the DL MU-MIMO control information may include information specifying—for each such receiving device—one or more respective spatial streams that are assigned to that receiving device. Other embodiments are described and claimed.

19 Claims, 10 Drawing Sheets

(52) U.S. Cl.
CPC .............. *H04W 4/08* (2013.01); *H04W 8/186* (2013.01); *H04W 52/0206* (2013.01); *H04W 52/0216* (2013.01); *H04W 72/005* (2013.01); *H04W 72/042* (2013.01); *H04W 72/046* (2013.01); *H04W 74/006* (2013.01)

(56) References Cited

U.S. PATENT DOCUMENTS

| | | | | |
|---|---|---|---|---|
| 8,982,812 | B2 * | 3/2015 | Abraham | H04W 72/046 370/329 |
| 9,007,967 | B2 * | 4/2015 | Cordeiro | H04W 8/18 370/310 |
| 9,166,666 | B2 * | 10/2015 | Ogawa | H04B 7/0452 |
| 9,203,586 | B2 * | 12/2015 | You | H04B 7/04 |
| 9,215,571 | B2 * | 12/2015 | Sohn | H04W 4/08 |
| 9,220,061 | B2 * | 12/2015 | Kim | H04W 52/0229 |
| 9,237,521 | B2 * | 1/2016 | Seok | H04B 7/0452 |
| 9,264,996 | B2 * | 2/2016 | Kim | H04L 1/0053 |
| 9,426,630 | B2 * | 8/2016 | Seok | H04W 4/06 |
| 9,596,688 | B2 | 3/2017 | Ghosh et al. | |
| 9,674,890 | B2 | 6/2017 | Song et al. | |
| 2012/0281774 | A1 * | 11/2012 | Lee | H04B 7/0452 375/260 |
| 2015/0282068 | A1 * | 10/2015 | Rajagopal | H04W 52/0206 370/350 |
| 2016/0165625 | A1 * | 6/2016 | Seok | H04B 7/0452 370/311 |
| 2017/0048866 | A1 | 2/2017 | Chu et al. | |
| 2017/0105229 | A1 | 4/2017 | Luo et al. | |

* cited by examiner

| HT-DMG PHY Sub-header Present 312 | Bandwidth 314 | MIMO Mode 316 | Number of STA/SS Pairs 304 | AID 308-1 | NSS 310-1 | AID 308-2 | NSS 310-2 | ... | MIMO Training Fields Present 318 |
|---|---|---|---|---|---|---|---|---|---|
| 1 | 4 | 1 | 3 | 8 | 3 | 8 | 3 | | 1 |

DL MU-MIMO Control Subfields 302

STA/SS Info. Pair 306-1 | STA/SS Info. Pair 306-2

Bits:

*FIG. 8*

Storage Medium 800

Computer Executable
Instructions for 600

Computer Executable
Instructions for 700

SIGNALING TECHNIQUES TO SUPPORT DOWNLINK (DL) MULTI-USER MULTIPLE-INPUT MULTIPLE-OUTPUT (MU-MIMO) IN 60 GHZ WIRELESS NETWORKS

RELATED CASE

This application claims priority to U.S. Provisional Patent Application No. 62/101,918, filed Jan. 9, 2015, the entirety of which is hereby incorporated by reference.

TECHNICAL FIELD

Embodiments described herein generally relate to wireless communications between devices in wireless networks.

BACKGROUND

The 60 GHz wireless communication frequency band offers substantial promise for use in accommodating the ever-growing data-rate demands of wireless communications devices and their users. The 60 GHz band contains a large amount of available bandwidth, and the physical properties of signals with frequencies in the 60 GHz band may support the application of robust beamforming and/or spatial multiplexing techniques and enable significant data rate improvements relative to the data rates achieved via lower frequency bands. In order to leverage such beneficial characteristics in a wireless network that uses the 60 GHz band, it may be desirable to configure wireless devices with downlink (DL) multi-user multiple-input multiple-output (MU-MIMO) capabilities. Configuring a wireless device with DL MU-MIMO capabilities may generally enable that device to make more efficient use of wireless channel resources by simultaneously/concurrently transmitting data to multiple other devices. However, according to conventional techniques for 60 GHz band communications, the use of DL MU-MIMO is not possible. For example, the Institute of Electrical and Electronics Engineers (IEEE) 802.11ad-2012 standard defines a physical layer (PHY) header that is neither capable of addressing a physical layer convergence procedure (PLCP) protocol data unit (PPDU) to multiple stations (STAs) nor capable of specifying assignments of different spatial streams to different such STAs.

BRIEF DESCRIPTION OF THE DRAWINGS

FIG. 3 illustrates an embodiment of a first header structure.
FIG. 8 illustrates an embodiment of a storage medium.

DETAILED DESCRIPTION

Figure 1:
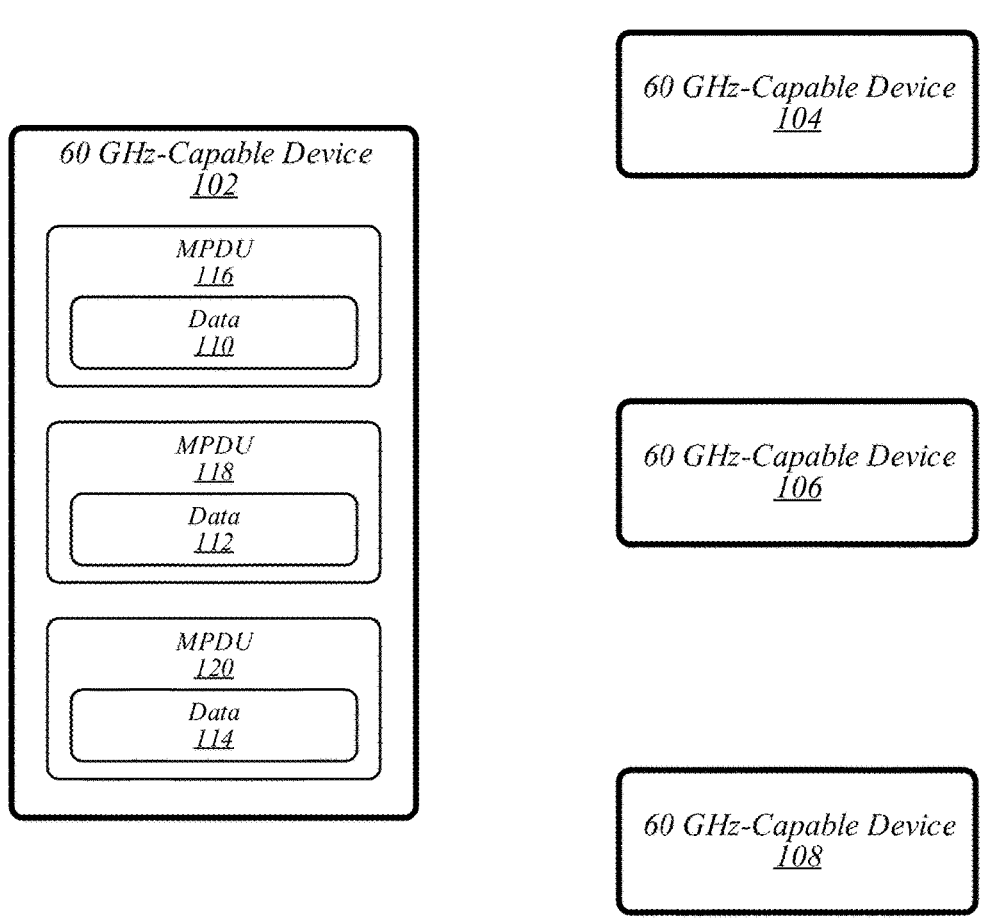
FIG. 1 illustrates an embodiment of a first operating environment.

Disclosed herein are signaling techniques to support DL MU-MIMO in 60 GHz wireless networks. According to various such techniques, a transmitting 60 GHz-capable device may be configured to include DL MU-MIMO control information in a PHY header of a PPDU that comprises respective data for multiple receiving devices. In some embodiments, the DL MU-MIMO control information may include information indicating the number of different receiving devices to which the PPDU is addressed. In various embodiments, the DL MU-MIMO control information may include information specifying a respective identifier for each such receiving device. In some embodiments, the DL MU-MIMO control information may include information indicating a number of spatial streams to be used to transmit the PPDU. In various embodiments, the DL MU-MIMO control information may include information specifying, for each of a plurality of such spatial streams, a respective receiving device for which the data in that spatial stream is intended. In some embodiments, the DL MU-MIMO control information may include information specifying—for each receiving device—one or more respective spatial streams that are assigned to that receiving device. The embodiments are not limited in this context.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Various embodiments herein are generally directed to wireless communications systems. Some embodiments are particularly directed to wireless communications over 60 GHz frequencies. Various such embodiments may involve wireless communications performed according to one or more standards for 60 GHz wireless communications. For example, some embodiments may involve wireless communications performed according to one or more Wireless Gigabit Alliance ("WiGig")/Institute of Electrical and Electronics Engineers (IEEE) 802.11ad standards, such as IEEE 802.11ad-2012, including their predecessors, revisions, progeny, and/or variants. Various embodiments may involve wireless communications performed according to one or more "next-generation" 60 GHz ("NG60") wireless local area network (WLAN) communications standards. Some embodiments may involve wireless communications performed according to one or more millimeter-wave (mm-Wave) wireless communication standards. It is worthy of note that the term "60 GHz," as it is employed in reference to various wireless communications devices, wireless communications frequencies, and wireless communications standards herein, is not intended to specifically denote a frequency of exactly 60 GHz, but rather is intended to generally refer to frequencies in, or near, the 57 GHz to 64 GHz frequency band. The embodiments are not limited in this context.

Various embodiments may additionally or alternatively involve wireless communications according to one or more other wireless communication standards. Some embodiments may involve wireless communications performed according to one or more broadband wireless communication standards. For example, various embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Additional examples of broadband wireless communication technologies/standards that may be utilized in some embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Further examples of wireless communications technologies and/or standards that may be used in various embodiments may include—without limitation—other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above. The embodiments are not limited to these examples.

FIG. 1 illustrates an example of an operating environment 100 such as may be representative of various embodiments. In operating environment 100, a 60 GHz-capable device 102 has respective data to transmit to each of a plurality of 60 GHz-capable devices comprising a 60 GHz-capable device 104, a 60 GHz-capable device 106, and a 60 GHz-capable device 108. More particularly, 60 GHz-capable device 102 has data 110 to transmit to 60 GHz-capable device 104, has data 112 to transmit to 60 GHz-capable device 106, and has data 114 to transmit to 60 GHz-capable device 108. In some embodiments, 60 GHz-capable devices 102, 104, 106, and 108 may comprise wireless communication devices in a wireless network that utilizes wireless channel frequencies of the 60 GHz band. In various embodiments, for example, 60 GHz-capable devices 102, 104, 106, and 108 may comprise wireless communication devices in a wireless local area network (WLAN) that utilizes 60 GHz band wireless communication frequencies. In some embodiments, 60 GHz-capable device 102 may comprise a personal basic service set (PBSS) control point/access point (PCP/AP). In various embodiments, 60 GHz-capable devices 104, 106, and 108 may comprise 60 GHz-capable stations (STAs). The embodiments are not limited in this context.

In operating environment 100, in order to send data to any particular one of 60 GHz-capable devices 104, 106, and 108, 60 GHz-capable device 102 encapsulates that data within one or more medium access control (MAC) protocol data units (MPDUs). In the example of FIG. 1, 60 GHz-capable device 102 encapsulates data 110 within an MPDU 116, encapsulates data 112 within an MPDU 118, and encapsulates data 114 within an MPDU 120. In order to send an MPDU to a given one of 60 GHz-capable devices 104, 106, and 108, 60 GHz-capable device 102 needs to encapsulate that MPDU within a PPDU for transmission to that 60 GHz-capable device. 60 GHz-capable device 102 may make more efficient use of wireless channel resources if it can encapsulate MPDUs 116, 118, and 120 in a same PPDU for DL MU-MIMO transmission to 60 GHz-capable devices 104, 106, and 108 using multiple spatial streams, rather than being required to transmit a first PPDU comprising MPDU 116, transmit a second PPDU comprising MPDU 118, and transmit a third PPDU comprising MPDU 120. However, according to conventional techniques, 60 GHz-capable device 102 may have no way of addressing a given PPDU to more than one receiving device or of notifying receiving devices of assigned spatial streams, and thus may not be able to successfully convey data to 60 GHz-capable devices 104, 106, and 108 via DL MU-MIMO data transmissions.

Disclosed herein are signaling techniques to support DL MU-MIMO in 60 GHz wireless networks. According to some such techniques, a transmitting 60 GHz-capable device such as 60 GHz-capable device 102 may be configured to include DL MU-MIMO control information in a PHY header of a PPDU that comprises respective data for multiple receiving devices. In various embodiments, the DL MU-MIMO control information may include information indicating the number of different receiving devices to which the PPDU is addressed. In some embodiments, the DL MU-MIMO control information may include information specifying a respective identifier for each such receiving device. In various embodiments, the DL MU-MIMO control information may include information indicating a number of spatial streams to be used to transmit the PPDU. In some embodiments, the DL MU-MIMO control information may include information specifying, for each of a plurality of such spatial streams, a respective receiving device for which the data in that spatial stream is intended. In various embodiments, the DL MU-MIMO control information may include information specifying—for each receiving device—one or more respective spatial streams that are assigned to that receiving device. The embodiments are not limited in this context.

Figure 2:
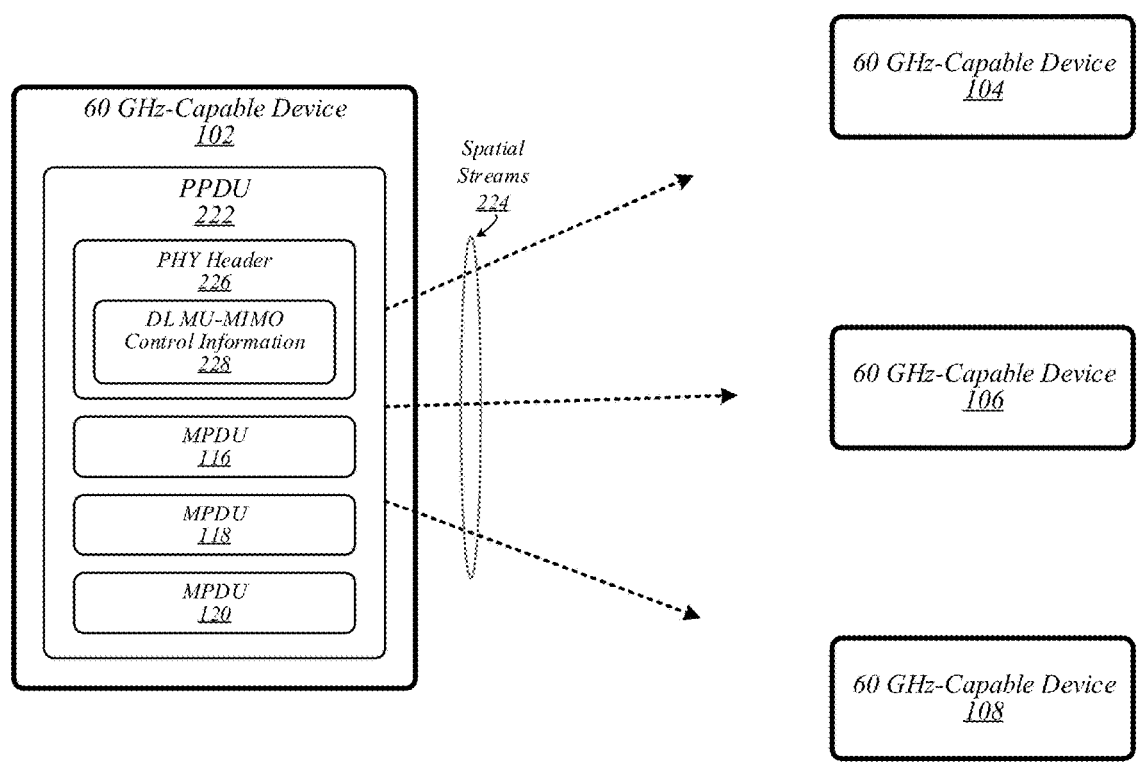
FIG. 2 illustrates an embodiment of a second operating environment.

FIG. 2 illustrates an example of an operating environment 200 such as may be representative of some embodiments that implement one or more of the disclosed signaling techniques to support DL MU-MIMO in 60 GHz wireless networks. In operating environment 200, 60 GHz-capable device 102 encapsulates MPDUs 116, 118, and 120 in a same PPDU 222 for DL MU-MIMO transmission to 60 GHz-capable devices 104, 106, and 108 using multiple spatial streams 224. In order to enable 60 GHz-capable devices 104, 106, and 108 to each detect that PPDU 222 contains a respective MPDU that is intended for them and to each successfully receive that respective MPDU, 60 GHz-capable device 102 includes DL MU-MIMO control information 228 in PPDU 222. More particularly, 60 GHz-capable device 102 includes DL MU-MIMO control information 228 in a PHY header 226 of PPDU 222. In various embodiments, DL MU-MIMO control information 228 may be comprised within one or more of a plurality of subfields of PHY header 226. The embodiments are not limited in this context.

In some embodiments, DL MU-MIMO control information 228 may comprise information indicating a number of receiving devices to which PPDU 222 is addressed. For example, in operating environment 200, DL MU-MIMO control information 228 may comprise information indicating that PPDU 222 is addressed to three receiving devices. In various embodiments, DL MU-MIMO control information 228 information identifying each such receiving device. For example, in operating environment 200, DL MU-MIMO control information 228 may comprise an association identifier (AID) for 60 GHz-capable device 104, an AID for 60 GHz-capable device 106, and an AID for 60 GHz-capable device 108. In some embodiments, DL MU-MIMO control information 228 may comprise information indicating a number of spatial streams 224 used for transmission of PPDU 222. In various embodiments, DL MU-MIMO control information 228 may comprise information specifying—for each receiving device to which PPDU is addressed—one or more respective spatial streams that are assigned to that receiving device. In some embodiments, DL MU-MIMO control information 228 may comprise information specifying—for each spatial stream 224 used for transmission of PPDU 222—a respective receiving device to which that spatial stream 224 is assigned. The embodiments are not limited in this context.

FIG. 3 illustrates an example of a header structure 300 such as may be representative of a header structure that may be used in various embodiments to implement signaling techniques to support DL MU-MIMO in 60 GHz wireless networks. More particularly, header structure 300 may be representative of a structure that may be used for PHY header 226 in some embodiments in order to enable PHY header 226 to convey DL MU-MIMO control information 228 to one or more receiving devices. In various embodiments, each of the one or more receiving devices may comprise a different respective 60 GHz-capable STA, and header structure 300 may be representative of a PHY header of a PPDU that a transmitting PCP/AP addresses to the one or more 60 GHz-capable STAs. In the remaining discussion, the receiving device(s) to which header structure 300 may be used to convey DL MU-MIMO control information shall simply be referred to as STAs. However, the embodiments are not limited in this context. As shown in FIG. 3, header structure 300 may comprise a plurality of subfields. For the purpose of explanation, example names are depicted for the various subfields in header structure 300. However, it is to be appreciated that the depicted names are exemplary only, and that the embodiments are not limited to these examples.

As shown in FIG. 3, header structure 300 comprises a set 302 of DL MU-MIMO control subfields. In some embodiments, the set 302 of DL MU-MIMO control subfields in header structure 300 may collectively comprise all of the subfields of header structure 300 that are used to convey DL MU-MIMO control information, such as DL MU-MIMO control information 228 of FIG. 2. It is worthy of note that although DL MU-MIMO control subfields 302 comprise a set of contiguous subfields in FIG. 3, the embodiments are not limited to such an arrangement, and DL MU-MIMO control subfields 302 may comprise non-contiguous subfields in various embodiments.

In some embodiments, header structure 300 may comprise a Number of STA/SS Pairs subfield 304. In various embodiments, Number of STA/SS Pairs subfield 304 may comprise information indicating a number of STA/SS information pairs 306-$i$ that follow subfield 304. More particularly, for each possible integer value of i from 1 to a positive integer specified by Number of STA/SS Pairs subfield 304, header structure 300 may comprise a respective STA/SS information pair 306-$i$. In the example of FIG. 3, header structure 300 contains STA/SS information pairs 306-1 and 306-2, and thus Number of STA/SS Pairs subfield 304 may contain/indicate a value of 2. In some embodiments, the length of Number of STA/SS Pairs subfield 304 may be defined based on a maximum number of STA/SS information pairs 306-$i$ that header structure 300 is permitted to contain. In various embodiments, the maximum number of STA/SS information pairs 306-$i$ that header structure 300 is permitted to contain may in turn be defined based on a maximum number MAX_NSS of spatial streams that may be used for DL MU-MIMO transmissions, a maximum number of different STAs to which a given PPDU may be addressed in conjunction with DL MU-MIMO transmission, or both. In the example of FIG. 3, Number of STA/SS Pairs subfield 304 comprises a length of three bits, which may be representative of some embodiments in which MAX_NSS=8 and header structure 300 is therefore permitted to contain up to eight STA/SS information pairs 306-$i$. In various embodiments, Number of STA/SS Pairs subfield 304 may comprise a different number of bits in order to accommodate a different defined MAX_NSS value and/or a different maximum number of STA/SS information pairs 306-$i$. The embodiments are not limited in this context.

In some embodiments, each STA/SS information pair 306-$i$ may comprise a respective set of one or more subfields containing DL MU-MIMO control information associated with a different respective STA. In various embodiments, each STA/SS information pair 306-$i$ may comprise DL MU-MIMO control information enabling a different respective STA to determine that a PPDU comprising header structure 300 contains data for that STA. In some embodiments, each STA/SS information pair 306-$i$ may comprise information specifying one or more spatial streams assigned to its respective STA. It is worthy of note that—with respect to Number of STA/SS Pairs subfield 304 and STA/SS information pairs 306-$i$—the term "pair" is used in the generic sense, to connote a set or combination of information, and is not intended to strictly denote a set or combination of exactly two things. As such, it is to be appreciated that in various embodiments, a particular STA/SS information pair 306-$i$ may not necessarily comprise two subfields, and/or may specify multiple spatial streams that are assigned to a same particular STA. The embodiments are not limited in this context.

In some embodiments, each STA/SS information pair 306-$i$ may comprise a respective AID subfield 308-$i$. For example, in FIG. 3, STA/SS information pair 306-1 comprises an AID subfield 308-1, and STA/SS information pair 306-2 comprises an AID subfield 308-2. In various embodiments, each AID subfield 308-$i$ may comprise an AID for a respective STA. In some embodiments, each AID subfield 308-$i$ may comprise a length of eight bits. In various embodiments, each STA/SS information pair 306-$i$ may comprise a respective NSS subfield 310-$i$. For example, in FIG. 3, STA/SS information pair 306-1 comprises an NSS subfield 310-1, and STA/SS information pair 306-2 comprises an NSS subfield 310-2. In some embodiments, each NSS subfield 310-*i* may specify a number of spatial streams that have been assigned to the STA identified by the corresponding AID subfield 308-*i*. For example, NSS subfield 310-1 may specify a number of spatial streams assigned to a STA identified by AID subfield 308-1, and NSS subfield 310-2 may specify a number of spatial streams assigned to a STA identified by AID subfield 308-2. In various embodiments, the lengths of the NSS subfields 310-*i* may be defined based on the defined MAX_NSS value. In the example of FIG. 3, each NSS subfield 310-*i* comprises a length of three bits, which may be representative of some embodiments in which MAX_NSS=8. In various embodiments, a different length may be defined for the NSS subfields 310-*i* in order to accommodate a different defined MAX_NSS. The embodiments are not limited in this context.

In some embodiments, any given STA to which a PPDU comprising header structure 300 is addressed may interpret the contents of DL MU-MIMO control subfields 302 in conjunction with a convention that spatial streams are assigned to the STAs identified by AID subfields 308-*i* based on the order in which their respective AID subfields 308-*i* appear in header structure 300 and their respective numbers of assigned spatial streams. In various embodiments, the convention may specify that the respective spatial streams assigned to each STA are to be consecutive with respect to a reference order defined for such spatial streams. In some embodiments, the convention may specify that the sum of the respective values contained/indicated by all of the NSS subfields 310-*i* in header structure 300 must be less than or equal to MAX_NSS.

In an example embodiment in which MAX_NSS=8, a PCP/AP that transmits a PPDU addressed to (and only to) both a first STA and a second STA and comprising header structure 300 may be permitted to assign one or more respective spatial streams from among a plurality of spatial streams $SS_1$-$SS_8$ to each of those two STAs. If the PCP/AP wishes to assign two spatial streams to the first STA and three spatial streams to the second STA, then according to a defined convention, it may assign spatial streams $SS_1$-$SS_2$ to the first STA and may assign spatial streams $SS_3$-$SS_5$ to the second STA. The PCP/AP may then populate the subfields of header structure 300 to reflect these assignments. Since the PPDU is addressed to two STAs, Number of STA/SS Pairs subfield 304 may contain/indicate a value of 2. Since $SS_1$ is assigned to the first STA, STA/SS information pair 306-1 may comprise information associated with the first STA. More particularly, AID subfield 308-1 may comprise an AID for the first STA, and NSS subfield 310-1 may contain/indicate a value of 2, indicating that the first two consecutive spatial streams $SS_1$-$SS_2$ are assigned to the first STA. Likewise, AID subfield 308-2 may comprise an AID for the second STA, and NSS subfield 310-2 may contain/indicate a value of 3, indicating that the next three consecutive spatial streams $SS_3$-$SS_5$ are assigned to the second STA. The embodiments are not limited to this example.

As reflected in FIG. 3, in various embodiments, header structure 300 may comprise one or more other subfields in addition to DL MU-MIMO control subfields 302. For example, in some embodiments, header structure 300 may comprise an HT-DMG PHY Sub-header Present subfield 312. In various embodiments, HT-DMG PHY Sub-header Present subfield 312 may comprise a length of one bit. In some embodiments, header structure 300 may comprise a Bandwidth subfield 314. In various embodiments, Bandwidth subfield 314 may comprise a length of four bits. In some embodiments, header structure 300 may comprise a MIMO Mode subfield 316. In various embodiments, MIMO Mode subfield 316 may comprise a length of one bit. In some embodiments, header structure 300 may comprise a MIMO Training Fields Present subfield 318. In various embodiments, MIMO Training Fields Present subfield 318 may comprise a length of one bit. The embodiments are not limited to these examples.

Figure 4:
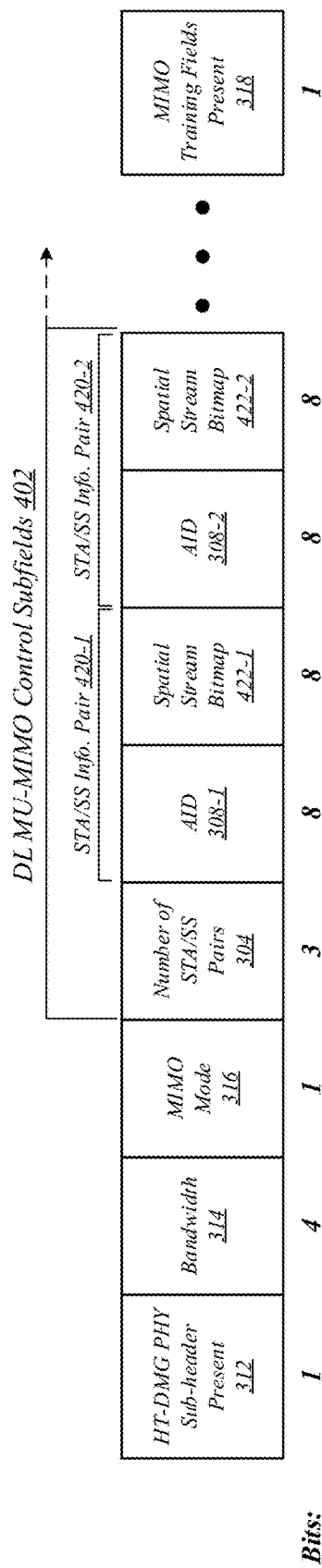
FIG. 4 illustrates an embodiment of a second header structure.

FIG. 4 illustrates an example of a header structure 400 such as may be representative of a header structure that may be used in some embodiments to implement signaling techniques to support DL MU-MIMO in 60 GHz wireless networks. As shown in FIG. 4, header structure 400 comprises many of the subfields discussed above in reference to header structure 300 of FIG. 3. However, the DL MU-MIMO control subfields 402 in header structure 400 contain STA/SS information pairs 420-*i* that comprise a different format than do the STA/SS information pairs 306-*i* in FIG. 3. More particularly, rather than simply specifying a number of spatial streams assigned to their corresponding STAs, the STA/SS information pairs 420-*i* in header structure 400 may comprise Spatial Stream Bitmap subfields 422-*i* that contain bitmaps specifying the particular respective spatial stream(s) assigned to their corresponding STAs. In various embodiments, the use of Spatial Stream Bitmap subfields 422-*i* may enable a PCP/AP to assign non-consecutive spatial streams to a same STA, rather than being constrained by a requirement that all of the spatial streams assigned to any given STA must be consecutive.

In some embodiments, each Spatial Stream Bitmap subfield 422-*i* may comprise a bit sequence of a length equal to MAX_NSS. In the example of FIG. 4, Spatial Stream Bitmap subfields 422-1 and 422-2 comprise lengths of eight bits, reflecting a scenario in which MAX_NSS=8. In various embodiments, each bit in the sequence may correspond to a respective one of MAX_NSS spatial streams that are available to a transmitting PCP/AP. In some embodiments, these correspondences may be defined according to a reference order for such spatial streams. For example, in an embodiment in which MAX_NSS=8 and a transmitting PCP/AP thus has eight spatial streams $SS_1$-$SS_8$ at its disposal, the first bit in each Spatial Stream Bitmap subfield 422-*i* may correspond to $SS_1$, the second bit in each Spatial Stream Bitmap subfield 422-*i* may correspond to $SS_2$, and so forth. In various embodiments, a value of '0' in a given bit position of a given Spatial Stream Bitmap subfield 422-*i* may indicate that the spatial stream corresponding to that bit position is not assigned to the STA to which that Spatial Stream Bitmap subfield 422-*i* applies. Likewise, a value of '1' in a given bit position of a given Spatial Stream Bitmap subfield 422-*i* may indicate that the spatial stream corresponding to that bit position is assigned to the STA to which that Spatial Stream Bitmap subfield 422-*i* applies.

In an example embodiment, Spatial Stream Bitmap subfield 422-1 may comprise the bit sequence '10101000', and Spatial Stream Bitmap subfield 422-2 may comprise the bit sequence '01010100'. In this example, the '1's in the first, third, and fifth bit positions of Spatial Stream Bitmap subfield 422-1 may indicate that spatial streams $SS_1$, $SS_3$, and $SS_5$ are assigned to a first STA identified by AID 308-1, and the '1's in the second, fourth, and sixth bit positions of Spatial Stream Bitmap subfield 422-2 may indicate that spatial streams $SS_2$, $SS_4$, and $SS_6$ are assigned to a second STA identified by AID 308-2. It is to be appreciated that in some embodiments, '0' values may be defined to indicate assigned spatial streams and '1' values may be defined to indicate non-assigned spatial streams. The embodiments are not limited in this context.

Figure 5:
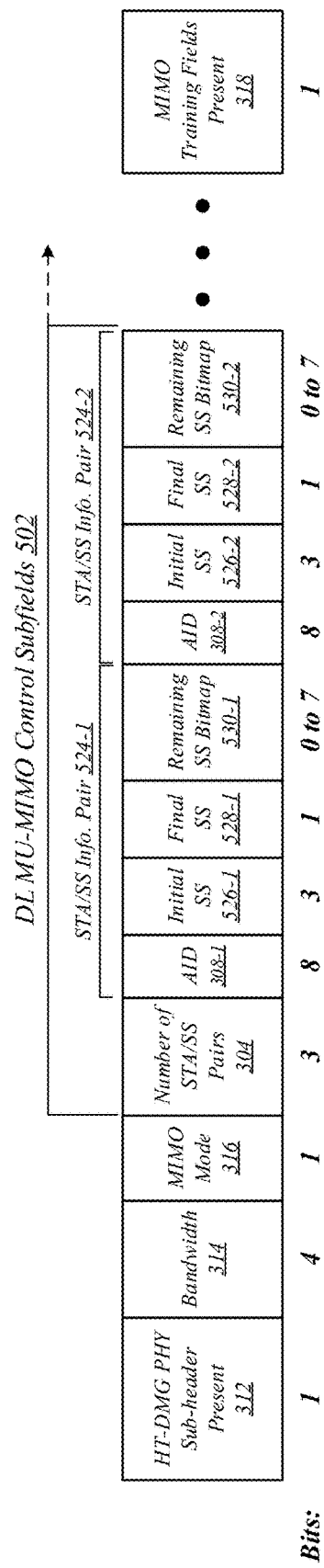
FIG. 5 illustrates an embodiment of a third header structure.

FIG. 5 illustrates an example of a header structure 500 such as may be representative of a header structure that may be used in various embodiments to implement signaling techniques to support DL MU-MIMO in 60 GHz wireless networks. More particularly, header structure 500 may be representative of a header structure that may be used in some embodiments to reduce the signaling overhead associated with transmission of DL MU-MIMO control information while retaining the spatial stream assignment flexibility afforded by header structure 400 of FIG. 4. As shown in FIG. 5, header structure 500 comprises many of the subfields discussed above in reference to header structure 300 of FIG. 3 and header structure 400 of FIG. 4. However, the DL MU-MIMO control subfields 502 in header structure 500 contain STA/SS information pairs 524-$i$ that comprise a different format than do the STA/SS information pairs 306-$i$ in FIG. 3 and the STA/SS information pairs 420-$i$ in FIG. 4. In various embodiments, the format of STA/SS information pairs 524-$i$ may enable a transmitting PCP/AP to exclude redundant information from PHY headers comprising header structure 500, and thus reduce the number of bits occupied by those PHY headers.

In some embodiments, each STA/SS information pair 524-$i$ may comprise a respective Initial SS subfield 526-$i$. In various embodiments, the lengths of the Initial SS subfields 526-$i$ may be defined based on the defined MAX_NSS value. In the example of FIG. 5, each Initial SS subfield 526-$i$ comprises a length of three bits, which may be representative of some embodiments in which MAX_NSS=8. In various embodiments, each respective Initial SS subfield 526-$i$ may contain/indicate a value identifying a first spatial stream assigned to its corresponding STA, according to a defined reference order for the set of available spatial streams. In an example embodiment, Initial SS subfield 526-1 may contain/indicate a value of 1, which may indicate that a first spatial stream $SS_1$ is assigned to the STA identified by AID subfield 308-1. In another example embodiment, Initial SS subfield 526-1 may contain/indicate a value of 5, which may indicate both that a fifth spatial stream $SS_5$ is assigned to the STA identified by AID subfield 308-1 and that none of spatial streams $SS_1$-$SS_4$ are assigned to that STA. In some embodiments, the use of Initial SS subfields 526-$i$ may enable a transmitting PCP/AP to convey the same information using a lesser number of bits in comparison to the number of bits that would be used in header structure 400 of FIG. 4. For example, in the aforementioned scenario in which Initial SS subfield 526-1 contains/indicates a value of 5, only three bits are used to convey assignment information for five spatial streams (spatial streams $SS_1$-$SS_5$). This constitutes a savings of two bits in comparison with header structure 400 of FIG. 4, according to which five bits would be used to convey the same assignment information. The embodiments are not limited to this example.

In various embodiments, each STA/SS information pair 524-$i$ may comprise a respective Final SS subfield 528-$i$. In some embodiments, each Final SS subfield 528-$i$ may comprise a length of one bit. In various embodiments, each Final SS subfield 528-$i$ may comprise a bit value indicating whether the spatial stream identified by its respective corresponding Initial SS subfield 526-$i$ is the only spatial stream assigned to the STA identified by its respective corresponding AID subfield 308-$i$. In an example embodiment, Initial SS subfield 526-1 may comprise a value of 1 and Final SS subfield 528-1 may comprise a bit value of '0', indicating that $SS_1$ is the only spatial stream assigned to the STA identified by AID subfield 308-1. In some embodiments, the use of Final SS subfields 528-$i$ may enable a transmitting PCP/AP to convey the same information using a lesser number of bits in comparison to the number of bits that would be used in header structure 400 of FIG. 4. For example, in the aforementioned scenario in which Initial SS subfield 526-1 comprises a value of 1 and Final SS subfield 528-1 comprises a bit value of '0', only four bits are used to convey assignment information for eight spatial streams (spatial streams $SS_1$-$SS_8$). This constitutes a savings of four bits in comparison with header structure 400 of FIG. 4, according to which eight bits would be used to convey the same assignment information. The embodiments are not limited to this example.

In various embodiments, each STA/SS information pair 524-$i$ in which the respective Final SS subfield 528-$i$ comprises a bit value indicating that the spatial stream identified by its corresponding Initial SS subfield 526-$i$ is not the only spatial stream assigned to the STA identified by its corresponding AID subfield 308-$i$ may comprise a Remaining SS Bitmap subfield 530-$i$. In some embodiments, each Remaining SS Bitmap subfield 530-$i$ may comprise a sequence of one or more bits that identify one or more additional spatial streams that are assigned to the STA identified by the corresponding AID subfield 308-$i$. In various embodiments, the length of each Remaining SS Bitmap subfield 530-$i$ may be determined according to the value contained/indicated by its respective corresponding Initial SS subfield 526-$i$. In some embodiments, each Remaining SS Bitmap subfield 530-$i$ may comprise one bit for each spatial stream that follows that identified by its corresponding Initial SS subfield 526-$i$, according to a defined reference order for the set of available spatial streams. In various embodiments, the bit length of each respective Remaining SS Bitmap subfield 530-$i$ may be equal to the difference between MAX_NSS and the value contained/indicated by the respective corresponding Initial SS subfield 526-$i$. In some embodiments, each bit in any given Remaining SS Bitmap subfield 530-$i$ may comprise a bit value indicating whether a respective one of the subsequent spatial streams is assigned to the STA identified by the corresponding AID subfield 308-$i$. In an example embodiment, Initial SS subfield 526-1 may contain/indicate a value of 5—indicating that spatial streams $SS_1$-$SS_4$ are not assigned to the STA identified by AID subfield 308-1 but that spatial stream $SS_5$ is assigned to that STA—and Final SS subfield 528-1 may comprise a bit value of '1', indicating that at least one of spatial streams $SS_6$—$SS_8$ is also assigned to that STA. In such an example embodiment, Remaining SS Bitmap subfield 530-1 may comprise a length of three bits, where each bit corresponds to a respective one of spatial streams $SS_6$—$SS_8$. In this example, if Remaining SS Bitmap subfield 530-1 comprises the bit sequence '101', this may indicate that spatial streams $SS_6$ and $SS_8$ are assigned to the STA, and that spatial stream $SS_7$ is not assigned to the STA. The embodiments are not limited to this example.

It is to be appreciated that since the respective values contained/indicated by Initial SS subfields 526-$i$ may vary from STA/SS information pair 524-$i$ to STA/SS information pair 524-$i$, the lengths of Remaining SS Bitmap subfields 530-$i$ may also vary from STA/SS information pair 524-$i$ to STA/SS information pair 524-$i$. For example, if Initial SS subfield 526-1 contains/indicates a value of 3, Initial SS subfield 526-2 contains/indicates a value of 6, and Final SS subfields 528-1 and 528-2 both comprise bit values of '1', then Remaining SS Bitmap subfield 530-1 may comprise a length of five bits, while Remaining SS Bitmap subfield 530-2 may comprise a length of two bits. The embodiments are not limited to this example.

In various embodiments, by using Remaining SS Bitmap subfields 530-*i* in conjunction with Initial SS subfields 526-*i* and Final SS subfields 528-*i*, header structure 500 may provide transmitting PCP/APs with the same ability to specify non-consecutive spatial stream assignments as is provided by header structure 400 of FIG. 4. At the same time, header structure 500 may provide transmitting PCP/APs with the flexibility both to make use of this ability when it is needed and to realize additional bit savings when it is not needed. The embodiments are not limited in this context.

Figure 6:
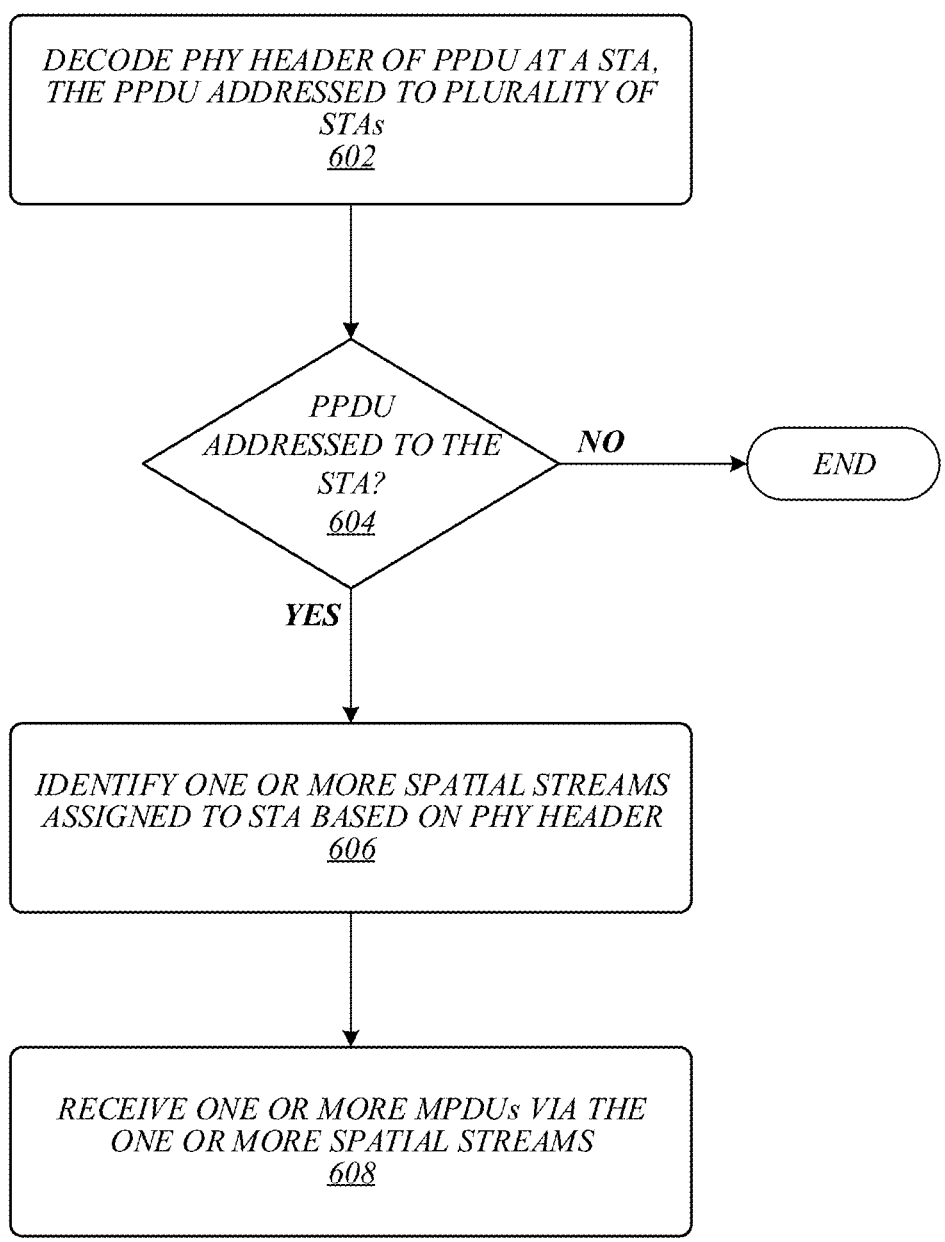
FIG. 6 illustrates an embodiment of a first logic flow.

FIG. 6 illustrates an example of a logic flow 600, which may be representative of operations that may be performed in various embodiments in conjunction with the implementation of the disclosed signaling techniques to support DL MU-MIMO in 60 GHz wireless networks. For example, logic flow 600 may be representative of operations that may be performed in various embodiments by one or more of 60 GHz-capable devices 104, 106, and 108. In some such embodiments, one or more of 60 GHz-capable devices 104, 106, and 108 may perform the operations of logic flow 600 in conjunction with operating as STAs in a 60-GHz band wireless network. As shown in FIG. 6, a PHY header of a PPDU addressed to a plurality of STAs may be decoded at a STA at 602. For example, 60 GHz-capable device 104 may decode the PHY header 226 of PPDU 222. At 604, it may be determined whether the PPDU is addressed to the STA. For example, 60 GHz-capable device 104 may determine whether PPDU 222 is addressed to 60 GHz-capable device 104 based on whether DL MU-MIMO control information 228 contains an AID associated with 60 GHz-capable device 104. If it is determined at 604 that the PPDU is not addressed to the STA, the logic flow may end. If it is determined at 604 that the PPDU is addressed to the STA, flow may pass to 606.

At 606, one or more spatial streams that are assigned to the STA may be identified based on the PHY header. For example, 60 GHz-capable device 104 may identify one or more spatial streams 224 that are assigned to 60 GHz-capable device 104 based on PHY header 226. At 608, one or more MPDUs may be received via the one or more spatial streams. For example, 60 GHz-capable device 104 may receive one or more of MPDUs 116, 118, and 120 via one or more spatial streams 224 identified at 606. The embodiments are not limited to these examples.

Figure 7:
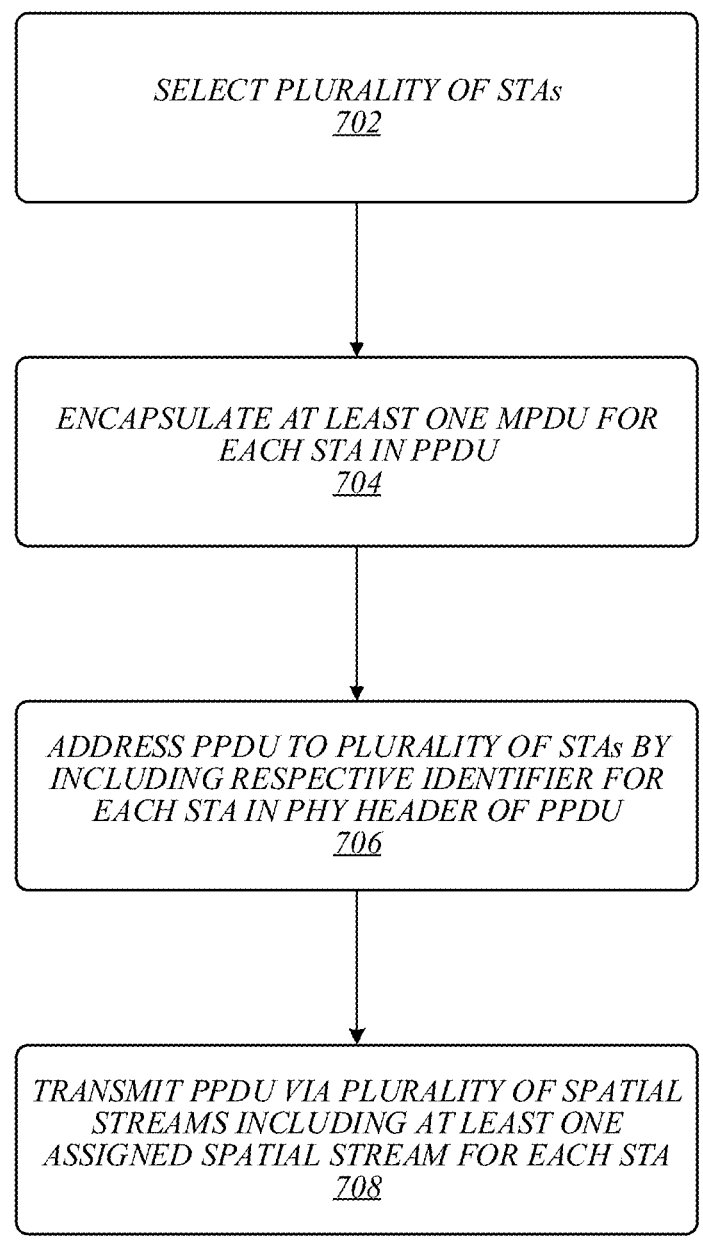
FIG. 7 illustrates an embodiment of a second logic flow.

FIG. 7 illustrates an example of a logic flow 700, which may be representative of operations that may be performed in some embodiments in conjunction with the implementation of the disclosed signaling techniques to support DL MU-MIMO in 60 GHz wireless networks. For example, logic flow 700 may be representative of operations that may be performed in some embodiments by 60 GHz-capable device 102. In various such embodiments, 60 GHz-capable device 102 may perform the operations of logic flow 700 in conjunction with operating as a PCP/AP for a 60 GHz-band wireless network. As shown in FIG. 7, a plurality of STAs may be selected at 702. For example, 60 GHz-capable device 102 may select a plurality of STAs comprising 60 GHz-capable devices 104, 106, and 108. At 704, at least one respective MPDU for each of the plurality of STAs may be encapsulated in a PPDU. For example, 60 GHz-capable device 102 may encapsulate an MPDU 116 for 60 GHz-capable device 104, an MPDU 118 for 60 GHz-capable device 106, and an MPDU 120 for 60 GHz-capable device 108 in PPDU 222.

At 706, the PPDU may be addressed to the plurality of STAs by including a respective identifier for each STA in the PHY header of the PPDU. For example, 60 GHz-capable device 102 may address PPDU 222 to 60 GHz-capable devices 104, 106, and 108 by including respective AIDs for 60 GHz-capable devices 104, 106, and 108 in appropriate subfields of PHY header 226. At 708, the PPDU may be transmitted via a plurality of spatial streams that includes at least one assigned spatial stream for each STA. For example, 60 GHz-capable device 102 may transmit PPDU 222 via a plurality of spatial streams 224, and the plurality of spatial streams 224 may include one or more spatial streams 224 assigned to 60 GHz-capable device 104, one or more spatial streams 224 assigned to 60 GHz-capable device 106, and one or more spatial streams 224 assigned to 60 GHz-capable device 108. The embodiments are not limited to these examples.

FIG. 8 illustrates an embodiment of a storage medium 800. Storage medium 800 may comprise any non-transitory computer-readable storage medium or machine-readable storage medium, such as an optical, magnetic or semiconductor storage medium. In various embodiments, storage medium 800 may comprise an article of manufacture. In some embodiments, storage medium 800 may store computer-executable instructions, such as computer-executable instructions to implement logic flow 600 of FIG. 6 and/or logic flow 700 of FIG. 7. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9:
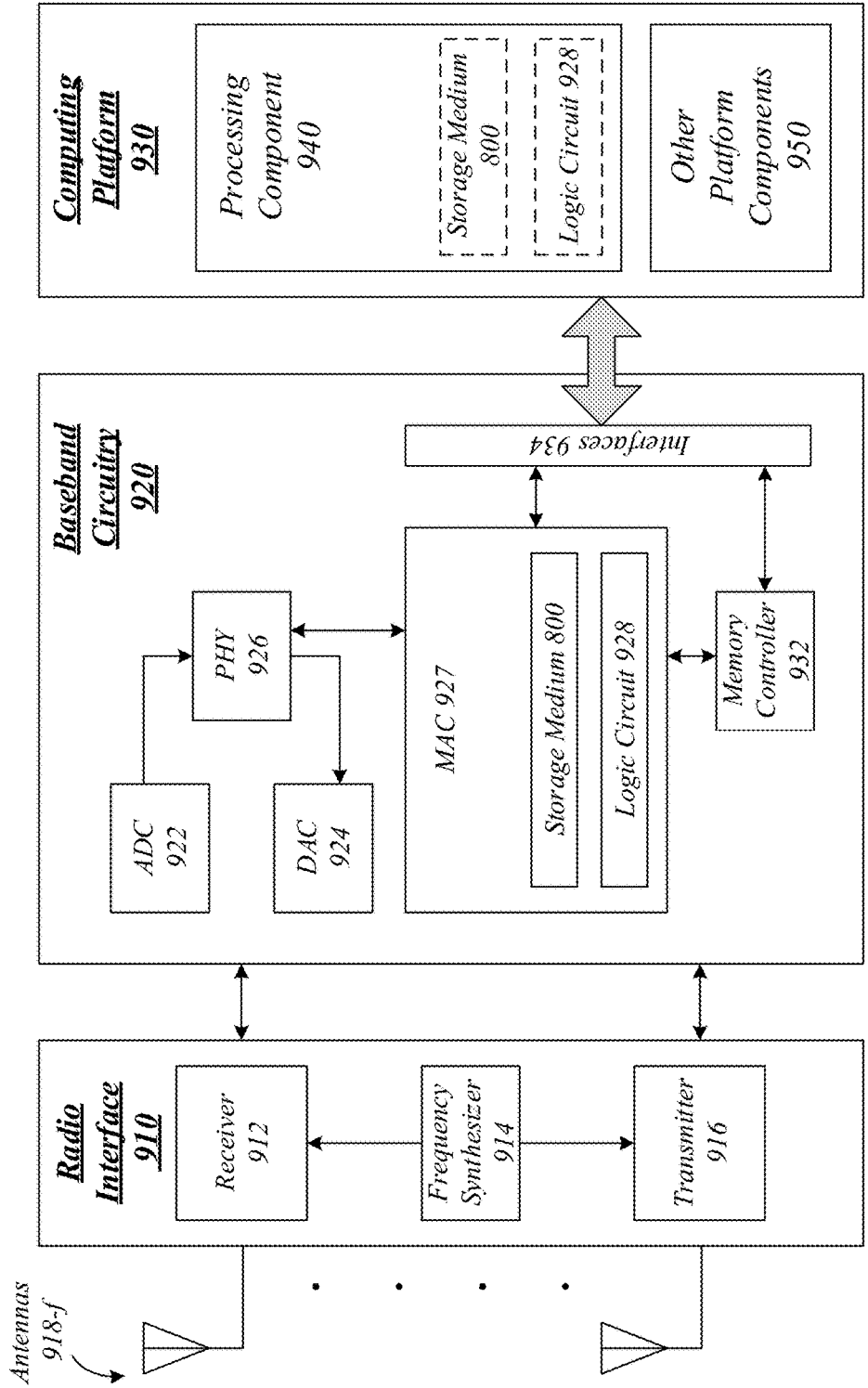
FIG. 9 illustrates an embodiment of a device.

FIG. 9 illustrates an embodiment of a communications device 900 that may implement one or more of 60 GHz-capable devices 102, 104, 106, and 108 of FIG. 1, logic flow 600 of FIG. 6, logic flow 700 of FIG. 7, and storage medium 800 of FIG. 8. In some embodiments, communications device 900 may be representative of a PCP/AP that transmits PPDUs containing PHY headers that comprise a structure corresponding to header structure 300 of FIG. 3, header structure 400 of FIG. 4, or header structure 500 of FIG. 5. In various embodiments, communication device 900 may be representative of a 60 GHz-capable STA that receives MPDUs via PPDUs containing PHY headers that comprise a structure corresponding to header structure 300 of FIG. 3, header structure 400 of FIG. 4, or header structure 500 of FIG. 5. The embodiments are not limited in this context.

In various embodiments, device 900 may comprise a logic circuit 928. The logic circuit 928 may include physical circuits to perform operations described for one or more of 60 GHz-capable devices 102, 104, 106, and 108 of FIG. 1, logic flow 600 of FIG. 6, and logic flow 700 of FIG. 7, for example. As shown in FIG. 9, device 900 may include a radio interface 910, baseband circuitry 920, and computing platform 930, although the embodiments are not limited to this configuration. In some embodiments, device 900 may implement some or all of the structure and/or operations for one or more of 60 GHz-capable devices 102, 104, 106, and 108 of FIG. 1, logic flow 600 of FIG. 6, logic flow 700 of FIG. 7, storage medium 800 of FIG. 8, and logic circuit 928 in a single computing entity, such as entirely within a single device. Alternatively, the device 900 may distribute portions of the structure and/or operations for one or more of 60 GHz-capable devices 102, 104, 106, and 108 of FIG. 1, logic flow 600 of FIG. 6, logic flow 700 of FIG. 7, storage medium 800 of FIG. 8, and logic circuit 928 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 910 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 910 may include, for example, a receiver 912, a frequency synthesizer 914, and/or a transmitter 916. Radio interface 910 may include bias controls, a crystal oscillator and/or one or more antennas 918-$f$. In another embodiment, radio interface 910 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 920 may communicate with radio interface 910 to process receive and/or transmit signals and may include, for example, an analog-to-digital converter 922 for down converting received signals, a digital-to-analog converter 924 for up converting signals for transmission. Further, baseband circuitry 920 may include a baseband or physical layer (PHY) processing circuit 926 for PHY link layer processing of respective receive/transmit signals. Baseband circuitry 920 may include, for example, a medium access control (MAC) processing circuit 927 for MAC/data link layer processing. Baseband circuitry 920 may include a memory controller 932 for communicating with MAC processing circuit 927 and/or a computing platform 930, for example, via one or more interfaces 934.

In some embodiments, PHY processing circuit 926 may include a frame construction and/or detection module, in combination with additional circuitry such as a buffer memory, to construct and/or deconstruct communication frames. Alternatively or in addition, MAC processing circuit 927 may share processing for certain of these functions or perform these processes independent of PHY processing circuit 926. In some embodiments, MAC and PHY processing may be integrated into a single circuit.

The computing platform 930 may provide computing functionality for the device 900. As shown, the computing platform 930 may include a processing component 940. In addition to, or alternatively of, the baseband circuitry 920, the device 900 may execute processing operations or logic for one or more of 60 GHz-capable devices 102, 104, 106, and 108 of FIG. 1, logic flow 600 of FIG. 6, logic flow 700 of FIG. 7, storage medium 800 of FIG. 8 and logic circuit 928 using the processing component 940. The processing component 940 (and/or PHY 926 and/or MAC 927) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 930 may further include other platform components 950. Other platform components 950 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 900 described herein, may be included or omitted in various embodiments of device 900, as suitably desired.

Embodiments of device 900 may be implemented using single input single output (SISO) architectures. However, certain implementations may include multiple antennas (e.g., antennas 918-*f*) for transmission and/or reception using adaptive antenna techniques for beamforming or spatial division multiple access (SDMA) and/or using MIMO communication techniques.

The components and features of device 900 may be implemented using any combination of discrete circuitry, application specific integrated circuits (ASICs), logic gates and/or single chip architectures. Further, the features of device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 10:
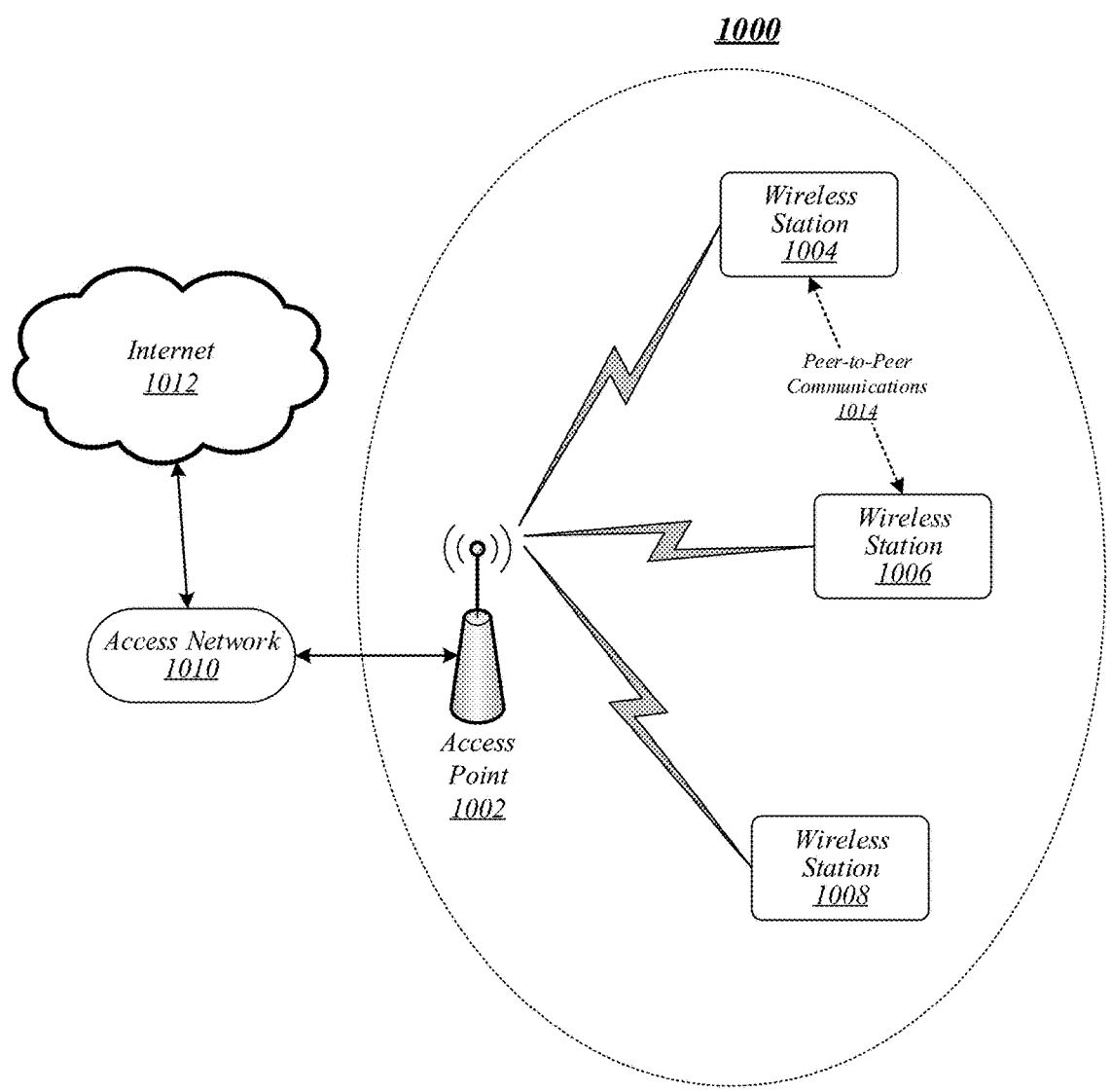
FIG. 10 illustrates an embodiment of a wireless network.

FIG. 10 illustrates an embodiment of a wireless network 1000. As shown in FIG. 10, wireless network comprises an access point 1002 and wireless stations 1004, 1006, and 1008. In various embodiments, wireless network 1000 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 1000 may comprise another type of wireless network, and/or may implement other wireless communications standards. In various embodiments, for example, wireless network 1000 may comprise a WWAN or WPAN rather than a WLAN. The embodiments are not limited to this example.

In various embodiments, wireless network 1000 may comprise a 60 GHz wireless network, and access point 1002 may communicate with one or more of wireless stations 1004, 1006, and 1008 via one or more 60 GHz band frequency channels. In some embodiments, access point 1002 may be representative of a PCP/AP that transmits PPDUs containing PHY headers that comprise a structure corresponding to header structure 300 of FIG. 3, header structure 400 of FIG. 4, or header structure 500 of FIG. 5. In various embodiments, one or more of wireless stations 1004, 1006, and 1008 may be representative of 60 GHz-capable STAs that receive MPDUs via PPDUs containing PHY headers that comprise a structure corresponding to header structure 300 of FIG. 3, header structure 400 of FIG. 4, or header structure 500 of FIG. 5. The embodiments are not limited in this context.

In some embodiments, wireless network 1000 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1×RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 1004, 1006, and 1008 may communicate with access point 1002 in order to obtain connectivity to one or more external data networks. In some embodiments, for example, wireless stations 1004, 1006, and 1008 may connect to the Internet 1012 via access point 1002 and access network 1010. In various embodiments, access network 1010 may comprise a private network that provides subscription-based Internet-connectivity, such as an Internet Service Provider (ISP) network. The embodiments are not limited to this example.

In various embodiments, two or more of wireless stations 1004, 1006, and 1008 may communicate with each other directly by exchanging peer-to-peer communications. For example, in the example of FIG. 10, wireless stations 1004 and 1006 communicate with each other directly by exchanging peer-to-peer communications 1014. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is a wireless communication apparatus, comprising logic, at least a portion of which is in hardware, the logic to decode a physical layer (PHY) header of a physical layer convergence procedure (PLCP) protocol data unit (PPDU) addressed to a plurality of stations (STAs), determine whether the PPDU is addressed to a STA based on the PHY header, and in response to a determination that the PPDU is addressed to the STA, identify one or more spatial streams assigned to the STA based on the PHY header.

Example 2 is the wireless communication apparatus of Example 1, the logic to receive one or more medium access control (MAC) protocol data units (MPDUs) via the one or more spatial streams.

Example 3 is the wireless communication apparatus of Example 1, the logic to determine that the PPDU is addressed to the STA in response to a determination that the PHY header comprises a subfield containing an association identifier (AID) of the STA.

Example 4 is the wireless communication apparatus of Example 1, the logic to identify, among a plurality of number of spatial streams (NSS) subfields of the PHY header, an NSS subfield associated with the STA and identify the one or more spatial streams based on the NSS subfield, the NSS subfield to comprise a value indicating a number of spatial streams assigned to the STA.

Example 5 is the wireless communication apparatus of Example 1, the logic to identify, among a plurality of spatial stream bitmap subfields of the PHY header, a spatial stream bitmap subfield associated with the STA and identify the one or more spatial streams based on the spatial stream bitmap subfield.

Example 6 is the wireless communication apparatus of Example 1, the PHY header to comprise an initial spatial stream (SS) subfield associated with the STA, the initial SS subfield to indicate a first spatial stream assigned to the STA according to a defined reference order.

Example 7 is the wireless communication apparatus of Example 6, the PHY header to comprise a final SS subfield corresponding to the initial SS subfield, the final SS subfield to indicate whether more than one spatial stream is assigned to the STA.

Example 8 is the wireless communication apparatus of Example 1, comprising a radio interface to receive the PHY header via one or more frequency channels of a 60 GHz frequency band.

Example 9 is a system, comprising a wireless communication apparatus according to any of Examples 1 to 8, at least one radio frequency (RF) transceiver, and at least one RF antenna.

Example 10 is the system of Example 9, comprising a touchscreen display.

Example 11 is a wireless communication apparatus, comprising logic, at least a portion of which is in hardware, the logic to select a plurality of stations (STAs) to which to address a physical layer convergence procedure (PLCP) protocol data unit (PPDU) and address the PPDU to each of the plurality of STAs by including a respective identifier for each of the plurality of STAs in a physical layer (PHY) header of the PPDU, and a radio interface to transmit the PPDU via a plurality of spatial streams, the PHY header to identify a respective assignment of one or more of the plurality of spatial streams to each of the plurality of STAs.

Example 12 is the wireless communication apparatus of Example 11, the PHY header to contain a subfield comprising a value to indicate a number of STAs to which the PPDU is addressed.

Example 13 is the wireless communication apparatus of Example 11, the PHY header to comprise a plurality of number of spatial streams (NSS) subfields, each NSS subfield to indicate a number of spatial streams assigned to a respective one of the plurality of STAs.

Example 14 is the wireless communication apparatus of Example 11, the PHY header to comprise a plurality of spatial stream bitmap subfields, each spatial stream bitmap subfield to identify one or more spatial streams assigned to a respective one of the plurality of STAs.

Example 15 is the wireless communication apparatus of Example 11, the PHY header to comprise a plurality of initial spatial stream (SS) subfields, each initial SS subfield to indicate a first spatial stream assigned to a respective one of the plurality of STAs according to a defined reference order applicable to the plurality of spatial streams.

Example 16 is the wireless communication apparatus of Example 11, the respective identifiers for the plurality of STAs to comprise association identifiers (AIDs).

Example 17 is the wireless communication apparatus of Example 11, the PPDU to encapsulate a plurality of medium access control (MAC) protocol data units (MPDUs), the plurality of MPDUs to include, for each of the plurality of STAs, at least one MPDU comprising data for that STA.

Example 18 is the wireless communication apparatus of Example 11, the radio interface to transmit the PPDU via one or more 60 GHz band frequency channels.

Example 19 is at least one non-transitory computer-readable storage medium, comprising a set of wireless communication instructions that, in response to being executed by circuitry of a station (STA), cause the STA to decode a physical layer (PHY) header of a physical layer convergence procedure (PLCP) protocol data unit (PPDU) addressed to a plurality of STAs, determine whether the PPDU is addressed to the STA based on the PHY header, and in response to a determination that the PPDU is addressed to the STA, identify one or more spatial streams assigned to the STA based on the PHY header.

Example 20 is the at least one non-transitory computer-readable storage medium of Example 19, comprising wireless communication instructions that, in response to being executed by the circuitry of the STA, cause the STA to receive one or more medium access control (MAC) protocol data units (MPDUs) via the one or more spatial streams.

Example 21 is the at least one non-transitory computer-readable storage medium of Example 19, comprising wireless communication instructions that, in response to being executed by the circuitry of the STA, cause the STA to determine that the PPDU is addressed to the STA in response to a determination that the PHY header comprises a subfield containing an association identifier (AID) of the STA.

Example 22 is the at least one non-transitory computer-readable storage medium of Example 19, comprising wireless communication instructions that, in response to being executed by the circuitry of the STA, cause the STA to identify, among a plurality of number of spatial streams (NSS) subfields of the PHY header, an NSS subfield associated with the STA and identify the one or more spatial streams based on the NSS subfield, the NSS subfield to comprise a value indicating a number of spatial streams assigned to the STA.

Example 23 is the at least one non-transitory computer-readable storage medium of Example 19, comprising wireless communication instructions that, in response to being executed by the circuitry of the STA, cause the STA to identify, among a plurality of spatial stream bitmap subfields of the PHY header, a spatial stream bitmap subfield associated with the STA and identify the one or more spatial streams based on the spatial stream bitmap subfield.

Example 24 is the at least one non-transitory computer-readable storage medium of Example 19, the PHY header to comprise an initial spatial stream (SS) subfield associated with the STA, the initial SS subfield to indicate a first spatial stream assigned to the STA according to a defined reference order.

Example 25 is the at least one non-transitory computer-readable storage medium of Example 24, the PHY header to comprise a final SS subfield corresponding to the initial SS subfield, the final SS subfield to indicate whether more than one spatial stream is assigned to the STA.

Example 26 is the at least one non-transitory computer-readable storage medium of Example 19, comprising wireless communication instructions that, in response to being executed by the circuitry of the STA, cause the STA to receive the PHY header via one or more frequency channels of a 60 GHz frequency band.

Example 27 is at least one non-transitory computer-readable storage medium, comprising a set of wireless communication instructions that, in response to being executed by circuitry of an access point (AP), cause the AP to select a plurality of stations (STAs) to which to address a physical layer convergence procedure (PLCP) protocol data unit (PPDU), address the PPDU to each of the plurality of STAs by including a respective identifier for each of the plurality of STAs in a physical layer (PHY) header of the PPDU, and transmit the PPDU via a plurality of spatial streams, the PHY header to identify a respective assignment of one or more of the plurality of spatial streams to each of the plurality of STAs.

Example 28 is the at least one non-transitory computer-readable storage medium of Example 27, the PHY header to contain a subfield comprising a value to indicate a number of STAs to which the PPDU is addressed.

Example 29 is the at least one non-transitory computer-readable storage medium of Example 27, the PHY header to comprise a plurality of number of spatial streams (NSS) subfields, each NSS subfield to indicate a number of spatial streams assigned to a respective one of the plurality of STAs.

Example 30 is the at least one non-transitory computer-readable storage medium of Example 27, the PHY header to comprise a plurality of spatial stream bitmap subfields, each spatial stream bitmap subfield to identify one or more spatial streams assigned to a respective one of the plurality of STAs.

Example 31 is the at least one non-transitory computer-readable storage medium of Example 27, the PHY header to comprise a plurality of initial spatial stream (SS) subfields, each initial SS subfield to indicate a first spatial stream assigned to a respective one of the plurality of STAs according to a defined reference order applicable to the plurality of spatial streams.

Example 32 is the at least one non-transitory computer-readable storage medium of Example 27, the respective identifiers for the plurality of STAs to comprise association identifiers (AIDs).

Example 33 is the at least one non-transitory computer-readable storage medium of Example 27, the PPDU to encapsulate a plurality of medium access control (MAC) protocol data units (MPDUs), the plurality of MPDUs to include, for each of the plurality of STAs, at least one MPDU comprising data for that STA.

Example 34 is the at least one non-transitory computer-readable storage medium of Example 27, comprising wireless communication instructions that, in response to being executed by the circuitry of the AP, cause the AP to transmit the PPDU via one or more 60 GHz band frequency channels.

Example 35 is a wireless communication method, comprising decoding, at a station (STA), a physical layer (PHY) header of a physical layer convergence procedure (PLCP) protocol data unit (PPDU) addressed to a plurality of STAs, determining, by processing circuitry of the STA, whether the PPDU is addressed to the STA based on the PHY header, and in response to a determination that the PPDU is addressed to the STA, identifying one or more spatial streams assigned to the STA based on the PHY header.

Example 36 is the wireless communication method of Example 35, comprising receiving one or more medium access control (MAC) protocol data units (MPDUs) via the one or more spatial streams.

Example 37 is the wireless communication method of Example 35, comprising determining that the PPDU is addressed to the STA in response to a determination that the PHY header comprises a subfield containing an association identifier (AID) of the STA.

Example 38 is the wireless communication method of Example 35, comprising identifying, among a plurality of number of spatial streams (NSS) subfields of the PHY header, an NSS subfield associated with the STA, and identifying the one or more spatial streams based on the NSS subfield, the NSS subfield to comprise a value indicating a number of spatial streams assigned to the STA.

Example 39 is the wireless communication method of Example 35, comprising identifying, among a plurality of spatial stream bitmap subfields of the PHY header, a spatial stream bitmap subfield associated with the STA, and identifying the one or more spatial streams based on the spatial stream bitmap subfield.

Example 40 is the wireless communication method of Example 35, the PHY header to comprise an initial spatial stream (SS) subfield associated with the STA, the initial SS subfield to indicate a first spatial stream assigned to the STA according to a defined reference order.

Example 41 is the wireless communication method of Example 40, the PHY header to comprise a final SS subfield corresponding to the initial SS subfield, the final SS subfield to indicate whether more than one spatial stream is assigned to the STA.

Example 42 is the wireless communication method of Example 35, comprising receiving the PHY header via one or more frequency channels of a 60 GHz frequency band.

Example 43 is at least one non-transitory computer-readable storage medium, comprising a set of instructions that, in response to being executed on a computing device, cause the computing device to perform a wireless communication method according to any of Examples 35 to 42.

Example 44 is an apparatus, comprising means for performing a wireless communication method according to any of Examples 35 to 42.

Example 45 is a system, comprising the apparatus of Example 44, at least one radio frequency (RF) transceiver, and at least one RF antenna.

Example 46 is the system of Example 45, comprising a touchscreen display.

Example 47 is a wireless communication method, comprising selecting, by processing circuitry at an access point (AP), a plurality of stations (STAs) to which to address a physical layer convergence procedure (PLCP) protocol data unit (PPDU), addressing the PPDU to each of the plurality of STAs by including a respective identifier for each of the plurality of STAs in a physical layer (PHY) header of the PPDU, and transmitting the PPDU via a plurality of spatial streams, the PHY header to identify a respective assignment of one or more of the plurality of spatial streams to each of the plurality of STAs.

Example 48 is the wireless communication method of Example 47, the PHY header to contain a subfield comprising a value to indicate a number of STAs to which the PPDU is addressed.

Example 49 is the wireless communication method of Example 47, the PHY header to comprise a plurality of number of spatial streams (NSS) subfields, each NSS subfield to indicate a number of spatial streams assigned to a respective one of the plurality of STAs.

Example 50 is the wireless communication method of Example 47, the PHY header to comprise a plurality of spatial stream bitmap subfields, each spatial stream bitmap subfield to identify one or more spatial streams assigned to a respective one of the plurality of STAs.

Example 51 is the wireless communication method of Example 47, the PHY header to comprise a plurality of initial spatial stream (SS) subfields, each initial SS subfield to indicate a first spatial stream assigned to a respective one of the plurality of STAs according to a defined reference order applicable to the plurality of spatial streams.

Example 52 is the wireless communication method of Example 47, the respective identifiers for the plurality of STAs to comprise association identifiers (AIDs).

Example 53 is the wireless communication method of Example 47, the PPDU to encapsulate a plurality of medium access control (MAC) protocol data units (MPDUs), the plurality of MPDUs to include, for each of the plurality of STAs, at least one MPDU comprising data for that STA.

Example 54 is the wireless communication method of Example 47, comprising transmitting the PPDU via one or more 60 GHz band frequency channels.

Example 55 is at least one non-transitory computer-readable storage medium, comprising a set of instructions that, in response to being executed on a computing device, cause the computing device to perform a wireless communication method according to any of Examples 47 to 54.

Example 56 is an apparatus, comprising means for performing a wireless communication method according to any of Examples 47 to 54.

Example 57 is a system, comprising the apparatus of Example 56, at least one radio frequency (RF) transceiver, and a plurality of RF antennas.

Example 58 is a wireless communication apparatus, comprising means for decoding, at a station (STA), a physical layer (PHY) header of a physical layer convergence procedure (PLCP) protocol data unit (PPDU) addressed to a plurality of STAs, means for determining whether the PPDU is addressed to the STA based on the PHY header, and means for identifying one or more spatial streams assigned to the STA based on the PHY header in response to a determination that the PPDU is addressed to the STA.

Example 59 is the wireless communication apparatus of Example 58, comprising means for receiving one or more medium access control (MAC) protocol data units (MPDUs) via the one or more spatial streams.

Example 60 is the wireless communication apparatus of Example 58, comprising means for determining that the PPDU is addressed to the STA in response to a determination that the PHY header comprises a subfield containing an association identifier (AID) of the STA.

Example 61 is the wireless communication apparatus of Example 58, comprising means for identifying, among a plurality of number of spatial streams (NSS) subfields of the PHY header, an NSS subfield associated with the STA, and means for identifying the one or more spatial streams based on the NSS subfield, the NSS subfield to comprise a value indicating a number of spatial streams assigned to the STA.

Example 62 is the wireless communication apparatus of Example 58, comprising means for identifying, among a plurality of spatial stream bitmap subfields of the PHY header, a spatial stream bitmap subfield associated with the STA, and means for identifying the one or more spatial streams based on the spatial stream bitmap subfield.

Example 63 is the wireless communication apparatus of Example 58, the PHY header to comprise an initial spatial stream (SS) subfield associated with the STA, the initial SS subfield to indicate a first spatial stream assigned to the STA according to a defined reference order.

Example 64 is the wireless communication apparatus of Example 63, the PHY header to comprise a final SS subfield corresponding to the initial SS subfield, the final SS subfield to indicate whether more than one spatial stream is assigned to the STA.

Example 65 is the wireless communication apparatus of Example 58, comprising means for receiving the PHY header via one or more frequency channels of a 60 GHz frequency band.

Example 66 is a system, comprising a wireless communication apparatus according to any of Examples 58 to 65, at least one radio frequency (RF) transceiver, and at least one RF antenna.

Example 67 is the system of Example 66, comprising a touchscreen display.

Example 68 is a wireless communication apparatus, comprising means for selecting, at an access point (AP), a plurality of stations (STAs) to which to address a physical layer convergence procedure (PLCP) protocol data unit (PPDU), means for addressing the PPDU to each of the plurality of STAs by including a respective identifier for each of the plurality of STAs in a physical layer (PHY) header of the PPDU, and means for transmitting the PPDU via a plurality of spatial streams, the PHY header to identify a respective assignment of one or more of the plurality of spatial streams to each of the plurality of STAs.

Example 69 is the wireless communication apparatus of Example 68, the PHY header to contain a subfield comprising a value to indicate a number of STAs to which the PPDU is addressed.

Example 70 is the wireless communication apparatus of Example 68, the PHY header to comprise a plurality of number of spatial streams (NSS) subfields, each NSS subfield to indicate a number of spatial streams assigned to a respective one of the plurality of STAs.

Example 71 is the wireless communication apparatus of Example 68, the PHY header to comprise a plurality of spatial stream bitmap subfields, each spatial stream bitmap subfield to identify one or more spatial streams assigned to a respective one of the plurality of STAs.

Example 72 is the wireless communication apparatus of Example 68, the PHY header to comprise a plurality of initial spatial stream (SS) subfields, each initial SS subfield to indicate a first spatial stream assigned to a respective one of the plurality of STAs according to a defined reference order applicable to the plurality of spatial streams.

Example 73 is the wireless communication apparatus of Example 68, the respective identifiers for the plurality of STAs to comprise association identifiers (AIDs).

Example 74 is the wireless communication apparatus of Example 68, the PPDU to encapsulate a plurality of medium access control (MAC) protocol data units (MPDUs), the plurality of MPDUs to include, for each of the plurality of STAs, at least one MPDU comprising data for that STA.

Example 75 is the wireless communication apparatus of Example 68, comprising means for transmitting the PPDU via one or more 60 GHz band frequency channels.

Example 76 is a system, comprising a wireless communication apparatus according to any of Examples 68 to 75, at least one radio frequency (RF) transceiver; and a plurality of RF antennas.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An apparatus, comprising:
a radio interface to receive, via one or more frequency channels of a 60 GHz frequency band, a physical layer (PHY) header of a physical layer convergence procedure (PLCP) protocol data unit (PPDU) addressed to a plurality of stations (STAs); and logic for a STA, at least a portion of the logic comprised in hardware, the logic to decode the PHY header, determine that the PPDU is addressed to the STA based on a determination that the PHY header comprises a subfield containing an association identifier (AID) of the STA, and in response to the determination that the PPDU is addressed to the STA, identify one or more spatial streams assigned to the STA based on the PHY header.

2. The apparatus of claim 1, the logic to receive one or more medium access control (MAC) protocol data units (MPDUs) via the one or more spatial streams.

3. The apparatus of claim 1, the logic to identify, among a plurality of number of spatial streams (NSS) subfields of the PHY header, an NSS subfield associated with the STA and identify the one or more spatial streams based on the NSS subfield, the NSS subfield to comprise a value indicating a number of spatial streams assigned to the STA.

4. The apparatus of claim 1, the logic to identify, among a plurality of spatial stream bitmap subfields of the PHY header, a spatial stream bitmap subfield associated with the STA and identify the one or more spatial streams based on the spatial stream bitmap subfield.

5. The apparatus of claim 1, the PHY header to comprise an initial spatial stream (SS) subfield associated with the STA, the initial SS subfield to indicate a first spatial stream assigned to the STA according to a defined reference order.

6. The apparatus of claim 5, the PHY header to comprise a final SS subfield corresponding to the initial SS subfield, the final SS subfield to indicate whether more than one spatial stream is assigned to the STA.

7. The apparatus of claim 1, comprising:
at least one radio frequency (RF) transceiver;
at least one RF antenna; and
a touchscreen display.

8. An apparatus, comprising:
logic, at least a portion of which is in hardware, the logic to select a plurality of stations (STAs) to which to address a physical layer convergence procedure (PLCP) protocol data unit (PPDU) and address the PPDU to each of the plurality of STAs by including a respective association identifier (AID) for each of the plurality of STAs in a physical layer (PHY) header of the PPDU; and
a radio interface to transmit the PPDU via one or more 60 GHz band frequency channels, the radio interface to transmit the PPDU via a plurality of spatial streams, the PHY header to identify a respective assignment of one or more of the plurality of spatial streams to each of the plurality of STAs.

9. The apparatus of claim 8, the PHY header to contain a subfield comprising a value to indicate a number of STAs to which the PPDU is addressed.

10. The apparatus of claim 8, the PHY header to comprise a plurality of number of spatial streams (NSS) subfields, each NSS subfield to indicate a number of spatial streams assigned to a respective one of the plurality of STAs.

11. The apparatus of claim 8, the PHY header to comprise a plurality of spatial stream bitmap subfields, each spatial stream bitmap subfield to identify one or more spatial streams assigned to a respective one of the plurality of STAs.

12. The apparatus of claim 8, the PHY header to comprise a plurality of initial spatial stream (SS) subfields, each initial SS subfield to indicate a first spatial stream assigned to a respective one of the plurality of STAs according to a defined reference order applicable to the plurality of spatial streams.

13. The apparatus of claim 8, the PPDU to encapsulate a plurality of medium access control (MAC) protocol data units (MPDUs), the plurality of MPDUs to include, for each of the plurality of STAs, at least one MPDU comprising data for that STA.

14. At least one non-transitory computer-readable storage medium, comprising a set of instructions that, in response to being executed by circuitry of a station (STA), cause the STA to:
receive, via one or more frequency channels of a 60 GHz frequency band, a physical layer (PHY) header of a physical layer convergence procedure (PLCP) protocol data unit (PPDU) addressed to a plurality of STAs;
determine that the PPDU is addressed to the STA based on a determination that the PHY header comprises a subfield containing an association identifier (AID) of the STA; and
in response to the determination that the PPDU is addressed to the STA, identify one or more spatial streams assigned to the STA based on the PHY header.

15. The at least one non-transitory computer-readable storage medium of claim 14, comprising instructions that, in response to being executed by the circuitry of the STA, cause the STA to receive one or more medium access control (MAC) protocol data units (MPDUs) via the one or more spatial streams.

16. The at least one non-transitory computer-readable storage medium of claim 14, comprising instructions that, in response to being executed by the circuitry of the STA, cause the STA to identify, among a plurality of number of spatial streams (NSS) subfields of the PHY header, an NSS subfield associated with the STA and identify the one or more spatial streams based on the NSS subfield, the NSS subfield to comprise a value indicating a number of spatial streams assigned to the STA.

17. The at least one non-transitory computer-readable storage medium of claim 14, comprising instructions that, in response to being executed by the circuitry of the STA, cause the STA to identify, among a plurality of spatial stream bitmap subfields of the PHY header, a spatial stream bitmap subfield associated with the STA and identify the one or more spatial streams based on the spatial stream bitmap subfield.

18. The at least one non-transitory computer-readable storage medium of claim 14, the PHY header to comprise an initial spatial stream (SS) subfield associated with the STA, the initial SS subfield to indicate a first spatial stream assigned to the STA according to a defined reference order.

19. The at least one non-transitory computer-readable storage medium of claim 18, the PHY header to comprise a final SS subfield corresponding to the initial SS subfield, the final SS subfield to indicate whether more than one spatial stream is assigned to the STA.

* * * * *